United States Patent [19]
Klukos

[11] 3,864,805
[45] Feb. 11, 1975

[54] MACHINE FOR INDEXING AND SCREW-MOUNTING OBJECTS TO A WORK PIECE

[76] Inventor: Edward O. Klukos, 2855 E. Judson, Spring Lake, Mich. 49456

[22] Filed: Jan. 23, 1974

[21] Appl. No.: 435,866

Related U.S. Application Data

[62] Division of Ser. No. 290,876, Sept. 21, 1972, Pat. No. 3,811,170.

[52] U.S. Cl............................. 29/211 R, 29/211 M
[51] Int. Cl........................ B23q 7/10, B23p 19/04
[58] Field of Search.......... 29/211 R, 211 D, 208 C, 29/208 D, 559, 429, 211 M; 144/32

[56] References Cited
UNITED STATES PATENTS

| | | | |
|---|---|---|---|
| 3,345,729 | 10/1967 | Law | 29/211 R |
| 3,465,410 | 9/1969 | Ernest et al. | 29/208 C |

*Primary Examiner*—Thomas H. Eager
*Attorney, Agent, or Firm*—Price, Heneveld, Huizenga & Cooper

[57] ABSTRACT

A clip mounting machine for screw-mounting clips or other objects to the edge of a panel includes a fixed housing in which is slidably mounted a main slide assembly including actuatable screw holding jaws at one end thereof. The main slide assembly further includes a screwdriver slide subassembly slidably positioned on the main slide assembly and to which is mounted a pair of powered screwdrivers. The machine includes clip dispensing means aligned with screw positioning means for receiving screws from supply chutes and positioning them for insertion. Means are provided for sequentially actuating the main slide, the screwdriver slide and the jaws for gripping the screws held by the screw positioning means and moving the jaws toward the panel. As the screws are advanced toward the panel, the screwdriver slide moves to preload the spring-loaded screwdriver shafts and the advancing screws capture a clip from the dispensing means and engage pilot holes in the panel. The screw holding jaws are then opened to permit the powered screwdrivers to drive the screws into the panel thereby mounting the clip thereto. In one embodiment, the machine includes a drill spaced from the screwdrivers for drilling pilot holes for the screws and means for alternately indexing the drill and the screwdrivers to the edge of the panel.

26 Claims, 20 Drawing Figures

MACHINE FOR INDEXING AND SCREW-MOUNTING OBJECTS TO A WORK PIECE

This is a division, of application Ser. No. 290,876 filed Sept. 21, 1972, now U.S. Pat. No. 3,811,170.

BACKGROUND OF THE INVENTION

The present invention relates to a machine for screw-mounting clips or the like to a work piece.

In metalworking, vertically oriented powered screwdrivers of the type in which a rotating screwdriver shaft is spring-loaded and released once engaged with a screw to drive the screw into the work piece is generally known. When self-powered screwdrivers are vertically oriented, screw holding means necessary for indexing the screw to a desired work piece can be relatively simple and straightforward in design since the screw will orient itself along a vertical axis.

Although many work pieces accommodate themselves to the use of vertically oriented powered screwdrivers, in several areas, generally horizontally oriented screwdrivers are needed. In the woodworking area, for example, where clips are mounted to the edges of relatively long and wide panels, it is desirable, in order to save space and use tables for holding the panels; to insert the screws horizontally into the edge of the panel lying flat on a table. This arrangement also allows the use of a horizontal table with a vertically movable platform thereby permitting the stacking of several panels on top of one another for successive machine operations.

When, however, employing a powered screwdriver operating along a generally horizontal axis, the problem of holding the screw aligned along a horizontal axis as it is rotated by the screwdriver and seated into the work piece, becomes relatively difficult. It is necessary, not only to seat the screwdriver head into the screw but also, at the same time, guide the opposite end of the screw into the work piece in such a manner such that when the spring-loaded screwdriver is released to drive the screw, the screw does not shift position thereby preventing its proper insertion.

In addition, when screw-mounting clips or the like along a generally horizontal axis, the clips must be aligned with the screws and dispensed to be captured by the screws as they advance to seat into the work piece.

SUMMARY OF THE INVENTION

The apparatus of the present invention solves the difficulties encountered when employing powered fastening tools such as screwdrivers oriented to operate along a generally horizontal axis. Machines embodying the present invention provide positioning means which receive fastening means such as screws from a supply of screws and orient them such that they can be gripped by jaws of the machine which advance the screws through receiving apertures in an object such as a clip dispensed by a dispensing means associated with the machine and aligned with the positioning means. The machine includes means for advancing the powered screwdrivers, seating the bits into the screws, and advancing the jaws and screwdrivers until the screw seats into the work piece. The jaws are then opened to permit the screws to be driven into the work piece by the spring-loaded powered screwdrivers.

In some embodiments, a powered drill for drilling pilot holes is mounted in the machine and spaced from the screwdrivers. Indexing means are provided to position the work piece alternately in alignment with the drill or screwdrivers during drilling and mounting steps respectively.

It is an object, therefore, of the present invention to provide an apparatus for the fastening of an object to a work piece.

Another object of the present invention is to provide a compact machine for the screw-mounting of an object to a work piece.

It is an additional object of the present invention to provide apparatus employing self-powered screwdrivers oriented to operate along a non-vertical axis for mounting clips or the like to a work piece.

Still a further object of the present invention is to provide a machine for dispensing objects in a manner to be captured by mounting screws as they are advanced to the work piece by self-powered screwdrivers.

Another object of the present invention is to provide improved means for positioning screws relative to a powered screwdriver.

A further object of the present invention is to provide dispensing means for clips cooperating with screw positioning and holding means such that a powered screwdriver can be employed for automatically screw-mounting clips to the edge of a panel.

These and other objects and features of the present invention will become apparent upon reading the following desscription thereof together with an examination of the accompanying drawings in which:

DETAILED DESCRIPTION OF THE PREFERRED EMBODIMENT

Figure 1:
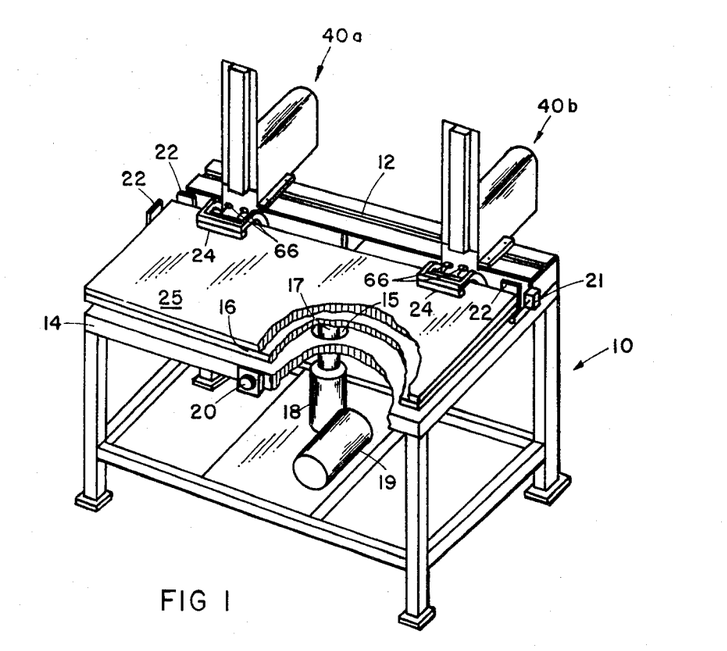
FIG. 1 is a perspective partly broken away view of an installation embodying the present invention.

Referring now to FIG. 1, there is shown an installation where two clip mounting machines 40a and 40b are positioned along one edge of a table 10 in a track assembly 12. This arrangement permits the spacing of the machines along the edge of the table to be adjusted as desired for mounting clips at various positions on the edge of a panel. The table 10 comprises a fixed horizontal platform 14 supported by suitable legs and cross members.

Indexing means for aligning a panel 25 to the machines includes a vertically movable platform 16 positioned above member 14 and coupled to the shaft 17 of a hydraulic cylinder 18 actuated by a pump and valve unit 19. Shaft 17 extends through an aperture 15 in platform 14 and may include key means cooperating with the aperture to hold platform 16 in a fixed orientation as it is raised and lowered. Other guide means such as vertical rails or the like can be mounted to table 10 to hold the platform in registration as it is moved.

Platform 16 includes guide means 22 along two sides thereof for seating the panel or other work piece 25 thereon in alignment with respect to the machines 40. Additionally, platform 16 includes a pair of hold-down clamps 24 along the edge adjacent each of the machines to securely hold the panel to the platform. Cylinder 18 is selectively actuated as described below to shift platform 16 an incremental vertical distance between a drilling position when the edge of panel 25 is centered with drill bits 66 on machines 40, and a raised clip mounting position where the panel is centered with screwdriver bits 143 extending from the machines.

Figure 2:
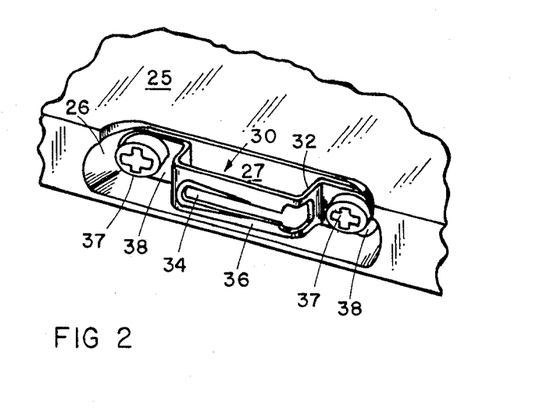
FIG. 2 is an enlarged partial perspective view of a panel showing a clip mounted thereto.

Panel 25 has a pair of clip mounting recesses 26 (one shown in FIG. 2) suitably formed along the edge in a conventional manner. When panel 25 is positioned on platform 16 and aligned by means of the guide brackets 22, the machines are aligned with these recesses. Each recess 26 is adapted to receive a clip 30 comprising, as seen in FIG. 2, a generally U-shaped member 32 having a slotted aperture 34 extending along a raised shoulder 36 thereof. A pair of screw receiving apertures 39 (FIG. 5) formed in end flanges 38 receive screws 37 for mounting the clip to the rear wall 27 of the recess.

The clips so mounted to panel 25 are adapted to receive a mating post positioned along an edge of a second panel (not shown) such that the two panels can be secured to each other by means of two or more clip and post pairs. Such construction permits relatively quick installation of panels to form room dividers, walls, cabinets, and etc.

Although the installation of FIG. 1 is specifically designed for mounting two clips to the edge of a panel, a variety of mounting schemes for the machines embodying the present invention can be incorporated for other panel and clip configurations. For example, machines can be mounted on opposite sides of the table to mount clips on recesses on opposite edges of each of the panels. Fewer or greater numbers of machines can be positioned along the table for simultaneously mounting one or more clips to the edge of the panel. Likewise, only one machine can be used with means for automatically controlling its horizontal position along the guide track 12 such that a single machine can install several clips along the edge of the panel. In addition, several panels can be stacked onto the platform which can be vertically moved incremental distances corresponding to the desired indexing stops to mount clips to the panels without necessitating the removal of a panel after each clip mounting operation. In each of the embodiments described and in others, identical machines can be employed; the only variations being in the means for indexing the machine with the panel for the mounting of the clips thereon.

The machines, although particularly adapted to mounting clips 30, as shown in FIG. 2, have equal applicability to mounting of clips of different configuration such as clips requiring a single mounting screw or objects different than clips entirely. Additionally, although the machine of the preferred embodiment described herein includes a drill for drilling pilot holes in the edge of a panel, in some installations, it may be desirable to predrill the pilot holes and index the panel directly with the automatically operated screwdriver for performing the mounting step only. In some installations also, pilot holes will be unnecessary.

Thus, it is seen that the machines shown in FIG. 1 have a wide range of uses, not limited to the mounting of clips onto panels. Having briefly described one installation of the machines embodying the present invention, a detailed description of the construction and operation of the machine follows.

Referring now to FIGS. 3 through 6, it is seen that each of the clip mounting machines 40 comprises a fixed housing 42 formed from left and right castings 42a and 42b respectively. As will be described in greater detail below, the housing 42 supports a dual bit drill assembly 60, a main slide assembly 70, a screwdriver slide assembly 80 with a pair of powered offset screwdrivers mounted thereto, screw gripping means 90, screw positioning means 100, and clip dispensing means 120 together with means for actuating these movable components in a sequence to install a clip on the edge of the board.

Figures 3, 5:
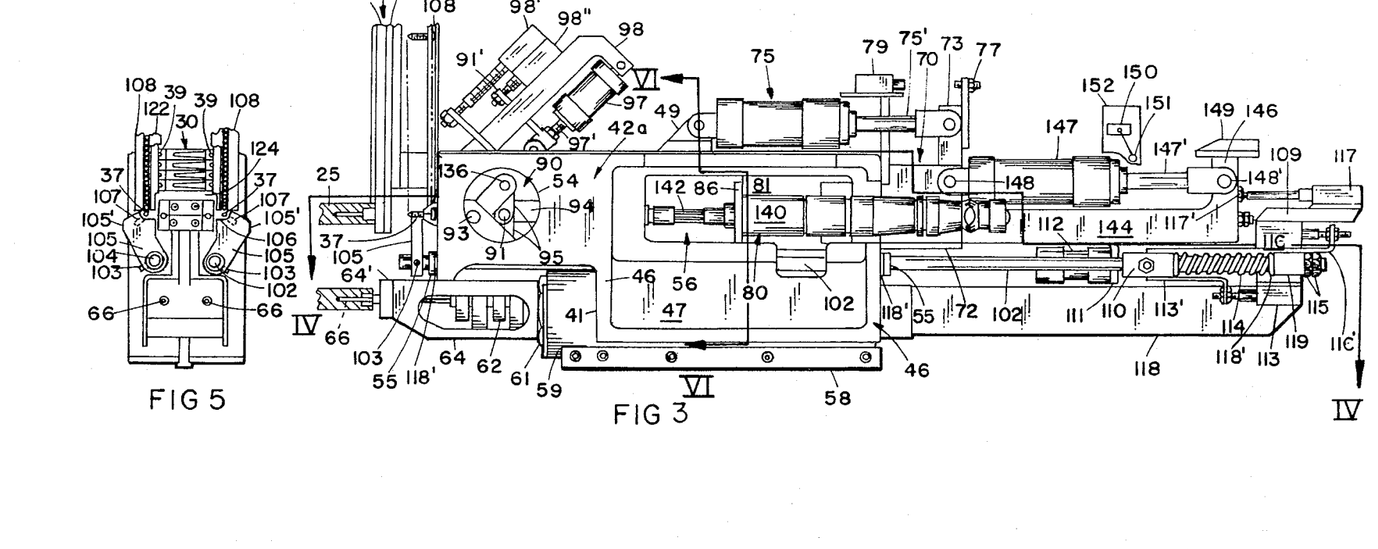
FIG. 3 is a side elevational view partly broken away of the apparatus of the present invention.
FIG. 5 is a front view of the apparatus shown in FIG. 3.
Figure 4:
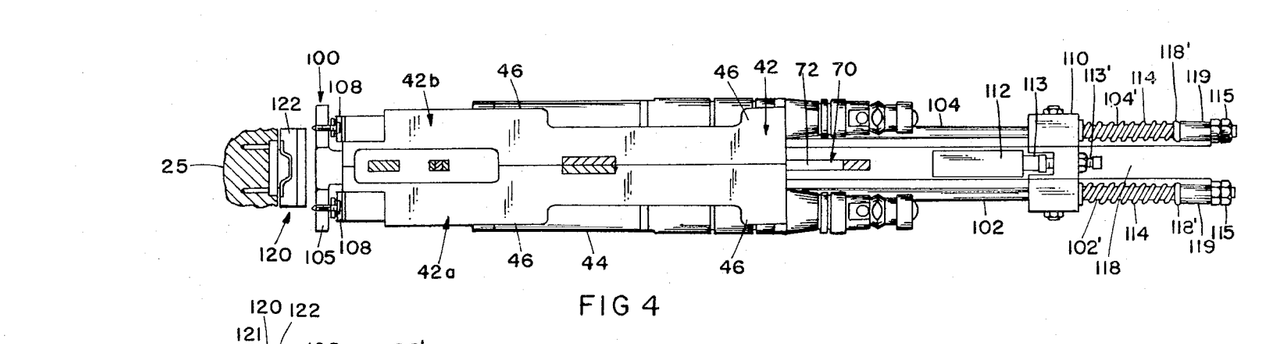
FIG. 4 is a cross-sectional view of the apparatus shown in FIG. 3 taken along the lines IV—IV in FIG. 3.
Figure 6:
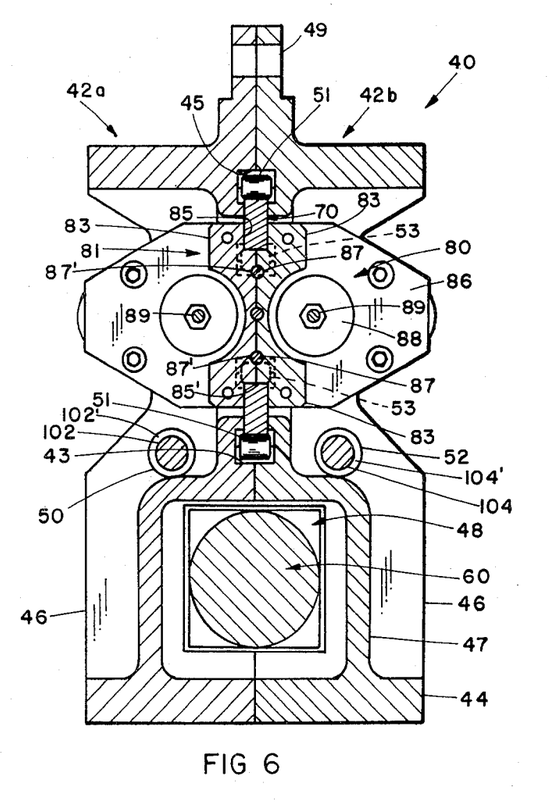
FIG. 6 is a cross-sectional view of the apparatus shown in FIG. 3 taken along the section lines VI—VI in FIG. 3.

Housing 42 comprises a base 44 and support ribs 46 extending upwardly therefrom (FIGS. 4 and 6). Walls 47 define a drill holding chamber 48 therein as best seen in FIG. 6. Above the chamber 48 there is formed lower and upper guide tracks 43 and 45 for receiving the main slide assembly 70 in slidable engagement therewith. The top of the housing 42 includes a mounting boss 49 to which one end of the main slide actuation cylinder 75 (FIG. 3) is coupled. The two halves 42a and 42b of the housing are joined with suitable interconnecting bolts (not shown) during the construction of the machine.

Housing 42 further includes a pair of apertures 50 and 52 (FIG. 6) extending longitudinally therethrough to permit control rods 102 and 104 to extend longitudinally through the housing. Suitable bushings 102' and 104' are provided to support the rods within the housing and allow their rotation. Housing 42 includes frontal access ports 54 on either side (FIG. 3) which permit access to the screw gripping means 90 and rear access ports 56 permitting access to the screwdriver slide assembly 80.

Coupled to the base 44 of housing 42 is a mounting plate 58 configured to permit mounting of the machine 40 to the guide track 12 (FIG. 1). Plate 58 also serves to couple a drill mounting adapter block 59 for drill assembly 60 to a lower front wall 41 of the housing 42. It is understood that wall 41 includes an aperture drilled therethrough of sufficient diameter to allow the dual bit chuck 62 of drill assembly 60 mounted within chamber 48 (FIG. 6) to extend outwardly and forwardly from housing 42. A locking nut 61 securely holds the drill assembly 60 in place and a guide bushing bracket 64 extends around the chuck 62.

The drill assembly 60 is a commercially available, pneumatically operated drill with a dual drill chuck which holds a pair of drill bits 66 as seen in FIGS. 1 and 5. The drill is cycled automatically once a panel is indexed to the drill position, to rotate bits 66 and advance them a predetermined depth into the panel and then retract the bits which are supported by bushings 64' mounted in the end of bracket 64. In FIG. 3, the bits are shown in the drilling position at the maximum depth within the edge of panel 25. As noted above, some machines embodying the present invention may not include the drill assembly 60.

Continuing now with the description of the machine, the means for reciprocating the powered screwdrivers to mount the screws includes assemblies 70 and 80. As best seen in FIGS. 3, 4, 13 and 15, the main slide assembly 70 comprises a generally flat rectangular plate 72 having a slotted aperture 74 adapted to receive the screwdriver slide assembly 80 therein. Forwardly of aperture 74 there is formed a second aperture 76 in which a slide forming part of the screw gripping means can reciprocate during the operation of the machine. A post 73 (FIG. 3) extends upwardly from the rear edge 71 of main slide 70. The end of shaft 75' of the main slide actuating cylinder 75 is secured to the post such that when actuated, cylinder 75 reciprocates the main slide plate 72.

Figure 18:
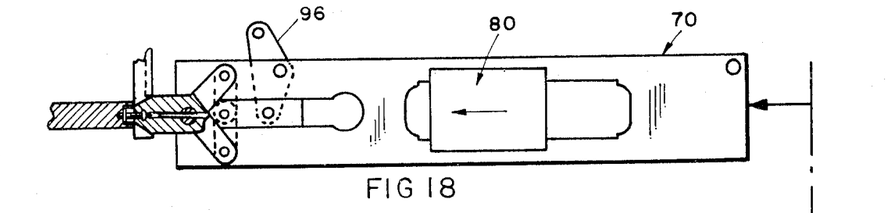
FIG. 18 is a schematic side elevational view of the apparatus as the main slide and screwdriver slide advance toward the work piece.
Figure 19:
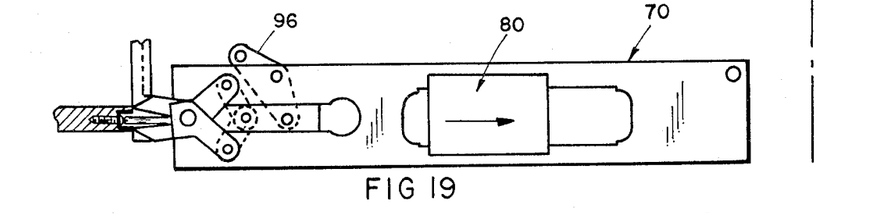
FIG. 19 is a schematic side elevational view of the apparatus as the gripping means open permitting the screws to be bottomed out.

As seen in FIG. 6, plate 72 is fitted within housing grooves 43 and 45 which include roller bearings 51 such that the slide can reciprocate between the rearward position shown in FIG. 3 and a forward position shown in FIGS. 18 and 19. Positioned on post 73 is an adjustable stop 77 which is adapted to engage a limit switch 79 fixedly positioned on the housing 42 to provide a signal indicating that the slide is fully advanced. The operation of this limit switch together with the remaining switches to control the machine is fully described below under OPERATION.

Figures 13, 14, 15, 16, 17:
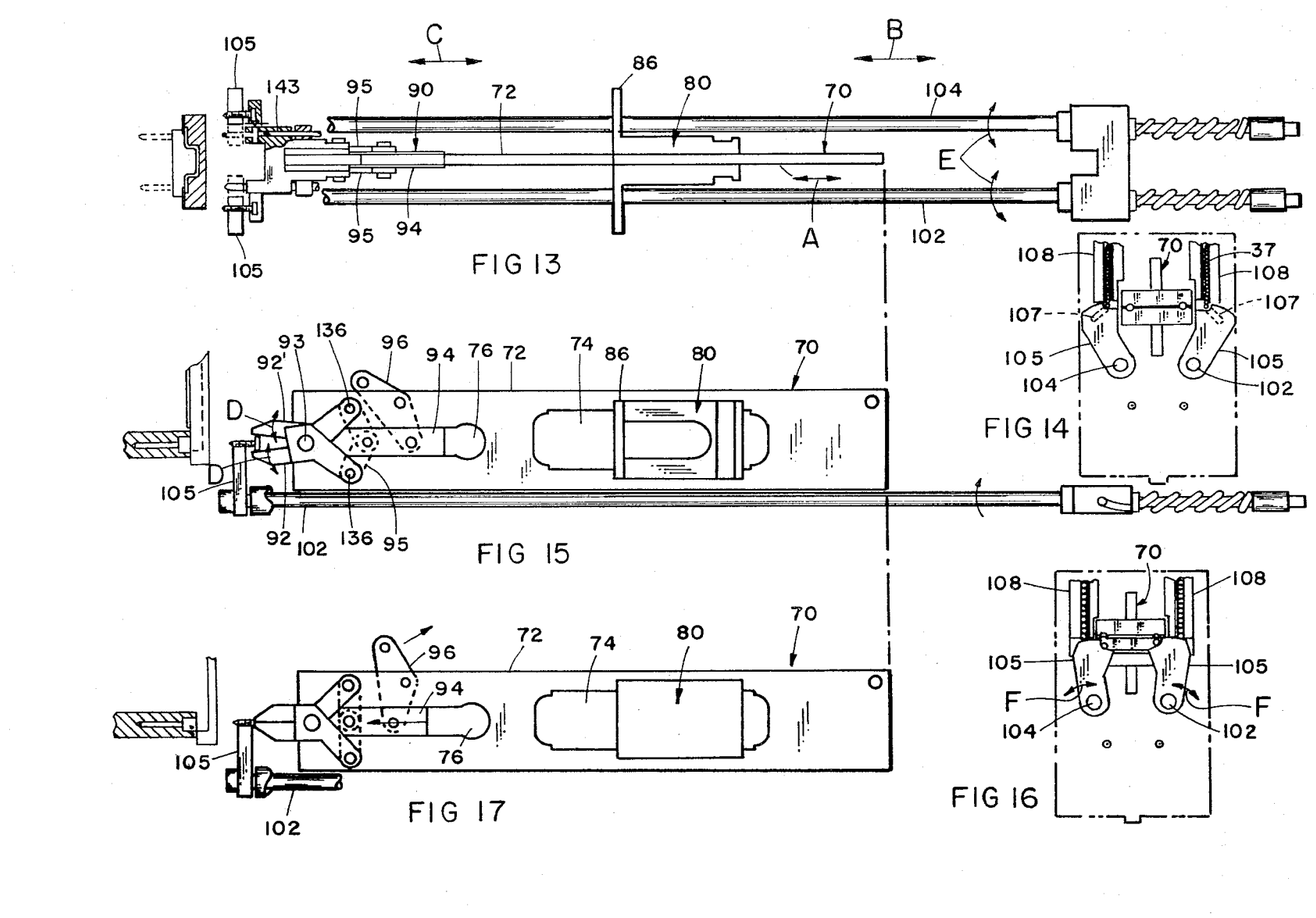
FIG. 13 is a plan schematic view of the apparatus shown in position at one portion of a cycle of operation.
FIG. 14 is a schematic front view of the apparatus shown in FIG. 13.
FIG. 15 is a schematic side elevational view of the apparatus shown in FIG. 13.
FIG. 16 is a schematic front view of the apparatus showing the screw positioning members in position to supply screws to the gripping means.
FIG. 17 is a schematic side elevational view of the apparatus as the gripping means close to hold the screws therein.

Positioned forwardly on the main slide assembly 70, as best seen in FIGS. 3, 13 and 15, is the screw gripping means 90 comprising a pair of dual lower and upper jaws 92 and 92' respectively. The jaws are pivotally coupled to the front of plate 72 by a pivot pin 93. The jaws are actuated between a closed screw holding position and an open screw releasing position by a jaw slide 94 slidably fitted within the slotted aperture 76 in plate 72 by means of interconnecting links 95 which are coupled between the ends of the jaws 92 and 92' and a pivot pin 91 at the forward end of slide 94. It is noted here that slide 94 is somewhat thicker than plate 72 (FIG. 13) and is guidably held within slot 76 by means of the links 95 which are positioned on opposite sides of plate 72 to connect each end of each jaw member to pivot pin 91.

Actuation arm 96 couples jaw slide 94 to a jaw actuation cylinder 97 shown in FIG. 3. Cylinder 97 is fixedly mounted at one end to the plate 72 means of bracket assembly 98. Positioned on bracket 98 is a pair of limit switches 98' and 98'' actuated by adjustable stops 99' and 99'' associated therewith and attached to the shaft 97' of cylinder 97 as seen in FIG. 3. These switches signal the travel limit of shaft 97' corresponding to jaw closed and jaw open positions.

Figure 9:
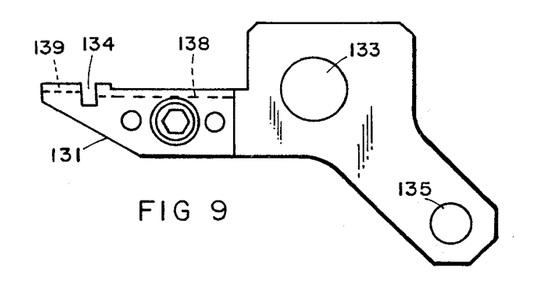
FIG. 9 is an enlarged side elevational view of the lower jaw members.
Figure 10:
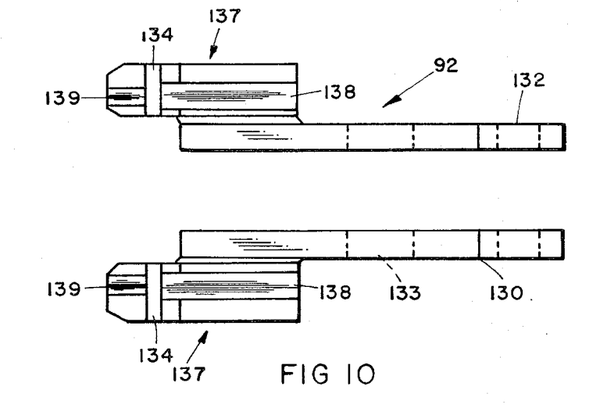
FIG. 10 is a plan view of the jaw members shown in FIG. 9.
Figures 11, 12:
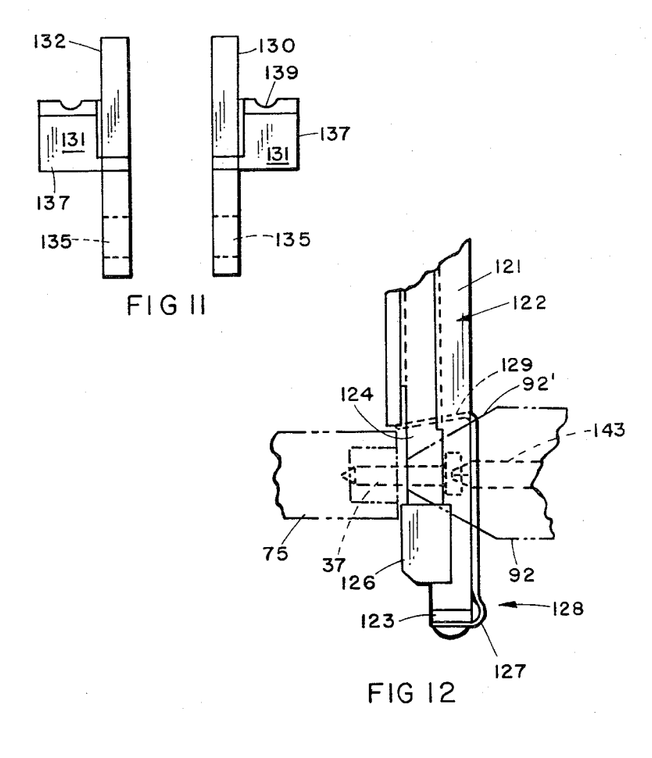
FIG. 11 is a front elevation of the jaw members shown in FIG. 10.
FIG. 12 is a fragmentary cross-sectional view of the clip dispensing means.

The lower jaw pair 92 is shown in detail in FIGS. 9, 10 and 11 and comprise a pair of jaw plates 130 and 132 having a central aperture 133 drilled therethrough to accommodate pivot pin 93 as seen in FIG. 3. At the lower right end of plates 130 and 132, as seen in FIG. 9, there is formed a second aperture 135 adapted to couple the jaw members to the interconnecting links 95 by means of pins 136 (FIGS. 3 and 15). Attached to the outer surface of each of the jaws at the forward end is a screwdriver guide and screw holding member 137.

Each of the members 137 includes a longitudinal semicircular recess 138 which, when the jaws 92 and 92' are in a closed position (FIGS. 12, 13, 17 and 18), guidably support the shanks 143 of the bits while permitting the rotation of the bits. Members 137 further include a transverse slot 134 communicating with a second longitudinal semicircular recess 139 extending to the front of each jaw member. Slot 134 and recess 139 mate with corresponding structure of the mating jaw member when jaws 92 and 92' are closed to hold the head and shank, respectively, of a screw 37. Members 134 are beveled at 131, as seen in FIGS. 9 and 11, to permit the jaws to extend through the opening 124 in the clip dispensing means 120 as seen in FIG. 12 and described in greater detail below. Slots 134 and recesses 139 are dimesnional to permit the screws held therein to be rotated by the rotating screwdriver bits engaged therewith.

Members 137 assure alignment of the screwdriver bits with the screw heads by virtue of the coaxially formed recesses 138 and 139 which communicate with each other through the screw head receiving slots 134. In some embodiments, it may be desirable to provide nylon inserts for the recesses 138 and 139 and slots 134 to provide low frictional contact with the screws and screwdriver bits. Upper jaw pairs 92' are identical to the lower jaw pair 92 and, as seen the figures, mate therewith when the machine is assembled.

Figure 7:
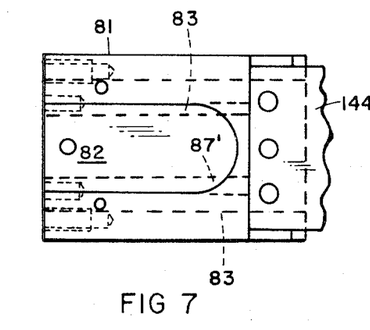
FIG. 7 is a side elevation of the left half of a screwdriver slide member employed in the preferred embodiment of the present invention.
Figure 8:
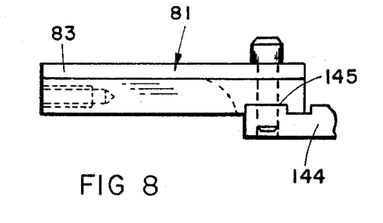
FIG. 8 is a plan view of the member shown in FIG. 7.

The screwdriver slide assembly 80 which holds a pair of powered screwdrivers 140 (FIGS. 3 and 4), comprises a pair of left and right slide members, the left one of which is shown in detail in FIGS. 7 and 8. Each of the slide members comprises a plate 81 having a recess 82 formed therein to receive the housing of one of the powered screwdrivers 140. As seen in FIGS. 6 and 8, plates 81 include upper and lower rigdes 83 which, when the left and right plates are assembled as seen in FIG. 6, form an upper and lower channel 85 and 85' respectively. The screwdriver slide 80, therefore, slidably engages in guided support with the inner edges of the main slide aperture 74 as seen in FIGS. 6 and 15.

Forwardly of plates 81 and mounted thereto is a screwdriver mounting plate 86 best shown in FIGS. 3 and 6. A pair of pins 87 are force-fitted into and extend from mounting plate 86. These pins are fitted within semicircular longitudinally extending grooves 87' formed in plates 81, as seen in FIG. 6, to provide accurate alignment between the mounting plate 86 and the screwdriver slide plates 81 thereby insuring accurate registration of the screwdrivers when bolted to the brackets 86 and plates 81. Bracket 86 includes a pair of recessed surfaces 88 adapted to receive the heads of the screwdrivers 140. Apertures 89 drilled through bracket 96 permit the shanks of the screwdrivers to extend forwardly through the mounting plate 86 as best seen in FIG. 3.

The screwdriver slide formed of left and right plates 81 and mounting plate 86 includes roller bearings 53 positioned in grooves 85 and 85' such that it easily slides within the aperture 74 of the main slide 70. An actuation arm 144 is coupled to the rear edge of plates 81 by means of the interlocking tongues 145, as best seen in FIG. 8, and extends rearwardly through the housing 40, as seen in FIG. 3, terminating in an upraised shoulder 146.

A screwdriver slide actuation cylinder 147 is anchored at one end to the main slide 70 by a pivot pin 148. Shaft 147' of cylinder 147 is coupled to shoulder 146 by pin 148' as seen in FIG. 3. Positioned on top of shoulder 146 is a tapered cam plate 149 which moves forwardly when the screwdriver slide is advanced by arm 144 to actuate a limit switch 150. Switch 150 is mounted on a fixed plate 152 suitably attached to housing 40 and has a roller follower 151 which is contacted by cam 149 as the screwdriver slide reaches the forward position thereby providing a signal representative thereof. The actuation of cylinder 147 causes the screwdriver slide assembly 80 to move relative to the main slide assembly while cylinder 75 moves both slides 70 and 80 in a manner described in greater detail below under OPERATION.

Each of the screwdrivers 140 is of the offset shaft type having a spring-loaded splined shaft 142 extending forwardly thereof as seen in FIG. 3. The screwdrivers are commercially available, pneumatically operated units and have a drive torque and speed which can be individually adjusted for a desired application. By employing the jaw assembly 90 which holds the screws 37 and screwdriver bits 143 engaged thereto, and by moving the screwdriver slide 70 forwardly; the splined shafts 142 are preloaded during the operation of the machine. When the screw holding jaws are released, the spring-loaded shafts 142 are released driving the screws into the work piece until the preset torque is reached and the screws are bottomed out. The unique design of the machine permits the mounting of the screwdrivers with their centers spaced very close (i.e., approximately 1 ¾ inches) to each other to accommodate small clips. This distance can, of course, be varied somewhat for different sized clips.

To dispense screws from a chute in a position to be gripped by the jaws, screw positioning means 100, best seen in FIGS. 3, 4 and 5, is employed. Means 100 comrises a pair of arms 105 attached to the ends of the rotatable control rods 102 and 104 by suitable lock screws 103 as best seen in FIG. 5. Screws 103 can be loosened for adjusting arms 105 on rods 102 and 104. Rods 102 and 104 extend through suitable bushings (102', 104', FIG. 6) in housing 42 and are held in place with antifriction thrust washers 118' and collars 55 (FIG. 3). The arms are spaced on the control rods such that with the jaws in a forward position and open as seen in FIG. 15, the positioning means position the screws such that when the jaws are closed, they grip the protruding head and shank of a screw. To hole the screws in an available position for the jaws, each arm 105 includes a notch 106 therein having a magnet 107 countersunk in the arms 105 such that the end of the magnet is adjacent the corner of notch 106. In the open position shown in FIG. 5, the notch contacts the lowermost screws 37 of the vertically stacked screws being fed from a hopper chute 108 to the arms 105. As seen in FIG. 4, chute 108 is configured to capture the heads of the screws 37 and permit the screws to slide downwardly to the arms 105. The top 105' (FIG. 5) of the arms 105 is shaped to prevent the next adjacent screw from dropping from chute 108 as the arms are moved to a closed position shown in FIG. 16.

The control rods 102 and 104 are threaded with a coarse helical track at ends 102' and 104' remote from arms 105 and extend through a helical threaded block 110 as seen in FIGS. 3 and 4. Ends 102' and 104' also extend through spacers 119 by means of antifriction thrust washers 118'. Nuts 115 attached to finely threaded ends of rods 102 and 104 holding them in place to spacers 119 while permitting their rotation.

To actuate the control rods, block 110 is coupled to an actuation cylinder 112 having a collar anchored to arm 144 by mounting bracket 111. The cylinder shaft 113 in turn is freely coupled to an adjustable stop 113' on block 110 such that when cylinder 112 is actuated, and arm 144 is rearward, the block moves lineally rotating the rods by means of the interengaged helical track.

A pair of springs 114 positioned between the block and the spacers bias the block in a normally forward position corresponding to the arms 105 being open as seen in FIG. 5. When cylinder 113 is actuated, block 110 moves rearwardly causing the control arms 102 and 104 to rotate inwardly, as seen in FIG. 16. Arms 105 move inwardly wiping the bottommost screw from chute 108 and positioning the screw in alignment with the axis of the screw holding recesses 139 of the jaws 92 and 92'. A limit switch 113 (FIG. 3) positioned on a bracket 118 extending from housing 42 is contacted by an adjustable stop 113' positioned on the sliding block 110 to provide a signal indicating arms 105 are in a closed screw aligned position. A second limit switch 116 is mounted on bracket 118 and is actuated by a stop 116' positioned on block 110 to provide a signal indicating the open position of arms 105. A third limit switch 117 is positioned on an arm 109 attached to bracket 118 and is actuated by an adjustable stop 117' on the screwdriver slide actuator arm 144 to provide a signal indicating that slides 70 and 80 are in the full rearward position. The use of these switches to control the machine is described under OPERATION below.

Having described the screw positioning means as well as the screw holding means, a description of the clip dispensing means 120 follows. The clip dispensing means feeds the clips 30, shown in detail in FIG. 2, to the front of the machine in an aligned position such that they can be stripped from the clip chute 122 by the advancing screws 37 held by jaws 92 and 92'. As best seen in FIGS. 4 and 5, means 120 includes a clip dispensing chute 122 with configurated vertical walls 121 for slidably holding a plurality of vertically stacked clips 30.

As seen in FIGs. 5 and 12, the walls 121 at the lower end of the clip chute 122 open at 124 to permit the jaws 92 and 92' to pass therethrough while holding the screws 37. To hold the clips in an aligned position as the screws are advanced by the jaws, a magnet 126 (FIG. 12) is positioned across the bottom of the clip chute and holds the clip in a releasable fashion prior to the capturing of the clip by the forwardly advancing screws. The screws will be aligned with the apertures 39 in the clips and strip the clip from the clip chute 122 as the jaws 92 and 92' move forwardly and advance the rotating screws into the work piece.

A leaf spring 128 is anchored at a bottom end 127 to a cross piece 123 spanning the vertical walls 121 of the clip chute 122. Spring 128 has a tapered top end 129 and is fabricated to be normally deflected away from the clip chute such that the clips can freely drop until the bottom clip contacts magnet 126 thereby positioning a single clip within the open aperture 124 of the chute. During the operation of the machine, the forwardly moving jaws 92 and 92' deflect the spring into the chute, as seen in FIG. 12, causing end 129 to hold the remaining clips within the chute 122 while the bottom clip is captured by the screws advancing to the work piece. As the machine continues its cycle of operation and the jaws retract, spring 128 will rotate in a clockwise direction (in FIG. 12) to permit the next clip to drop into contact with the magnet 126 and be in a position to be captured by the next cycle of the advancing screws and jaws. Having described the construction details of the various components of the machine, a description of a cycle of operation follows.

OPERATION

Figure 20:
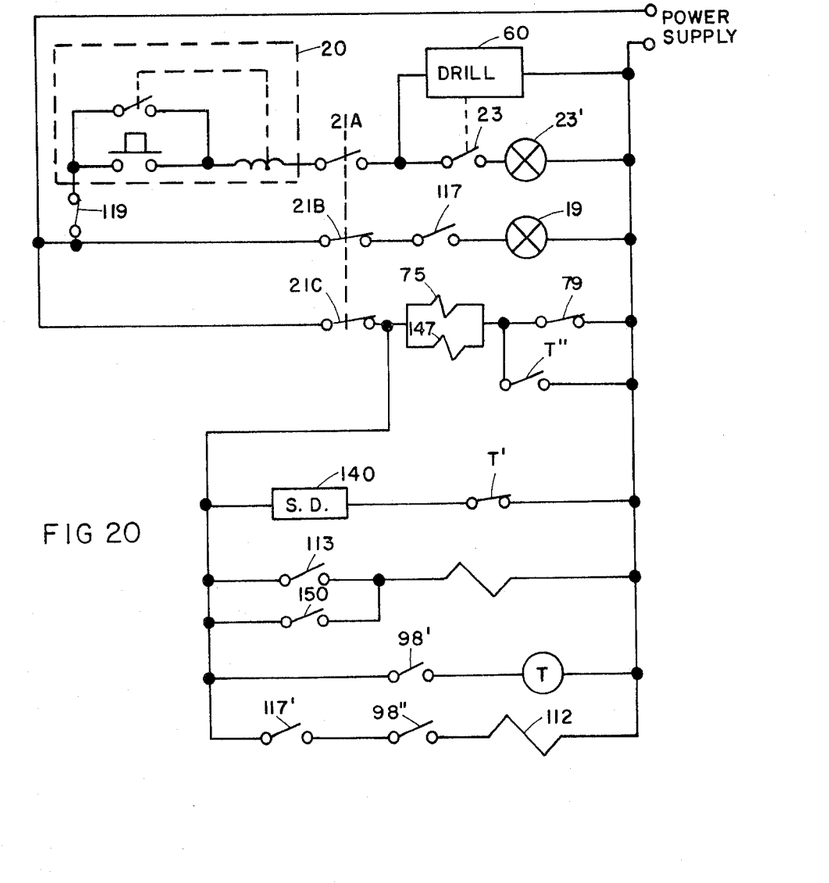
FIG. 20 is a circuit diagram in schematic form of the control circuit.

In order to fully understand a cycle of operation of the machine 40, reference is had to the operational sequence diagrams of FIGS. 13 through 19 which illustrate the position of the movable components during various portions of each cycle of operation. The control means includes the various sequencing (or limit) switches which provide automatic operation of the machine once initially started and are shown in FIGS. 3, 4 and 20. These switches can be pneumatic or electrically operated and are coupled to a supply line, as seen in FIG. 20, to operate as described below.

The main slide assembly 70 reciprocates forwardly and rearwardly as indicated by the arrow A in FIG. 13. The screwdriver slide assembly 80 reciprocates in the same directions indicated by arrow B as does the jaw slide 94 indicated by arrow C. The actuation of cam arm 96 and resulting motion of jaw slide 94 causes the jaws to open and close as indicated by arrows D (FIG. 15). Control rods 102 and 104 rotate in opposite directions, as seen by the arrows E in FIG. 13, causing arms 105 to move inwardly and outwardly as indicated by the arrows F in FIG. 16.

For the purposes of initiating a description of the cycle of operation, it is assumed that the main and screwdriver slides are in the rearward position, as seen in FIG. 15, and the screw holding arms are in their open position as seen in FIG. 15. At this time, the jaws are closed and holding a pair of screws.

To initiate a cycle of operation, the operator, having placed a panel in guided alignment on the movable platform 16 (FIG. 1), actuates a push button switch 20 (FIG. 1) which latches on and actuates clamp members 24 to close and hold the work piece 25 securely in position on table 16 and begins the cycling of the automatically operable drill assembly 60. It is noted here that the movable platform 16 has one or more limit switches 21 (FIGS. 1 and 20) or other detectors for detecting the indexed positions of the work piece to the table and allow the actuation od the drill mechanism 60 only when the table is properly indexed for the drilling step. In the event the table is not properly indexed for drilling, the drilling step is inhibited and the table must be moved manually or automatically to its indexed position before the cycle of operation can proceed. As noted earlier, in the event that the pilot holes have been predrilled or are unnecessary, this step of the operation is omitted.

The drill assembly 60 automatically cycles through the drilling step by advancing the rotating drilling bits a predetermined depth and returning to the starting position. Limit switch 23 (FIG. 20) is associated with the drill such that as the drill returns after having drilled the pilot holes, switch 23 is actuated to momentarily operate a control valve 23' providing a blast of air for cleaning out the pilot holes. A suitable nozzle directed toward the ends of the drill bits and coupled to the valve 23' in turn coupled to a source of pressurized air is provided for this step.

Limit switch 23 also actuates the hydraulic control 19 (FIG. 1) thereby shifting the position of platform 16 (FIG. 1) section 21B of limit switch 21 opens indicating that the work piece 25 has been shifted from the drilling indexed position to the screw mounting indexed position. In FIG. 20, switch 21 sections A, B and C are shown in the position corresponding to the table being indexed for the screw mounting operation.

Once the platform 16 reaches the desired indexed position, switch section 21C closes thereby providing an actuation signal for the main slide and screwdriver slide cylinders 75 and 147 respectively. This switch also actuates the powered screwdriver whose splined shaft 142 begins rotating. It is noted that this time, (i.e., during the initial portion of each operating cycle), the jaws 92 and 92' will be closed and holding a screw in aligned position therein.

Slides 70 and 80 advance as seen in FIG. 18 with the screwdriver slide moving along with the main slide and forwardly within the main slide such that the screwdriver head catches up with the screw head held within the jaws. The jaws and the rotating screwdriver bit seated within the screw head then advance forwardly stripping a clip from the clip dispensing means 120, using the rotating screws as pilots through the clip holes, until limit switches 79 and 150 are actuated. Switch 150 closes to actuate the jaw actuating cylinder 97 while switch 79 opens to stop the motion of the slides. At this time, the screw tips extend slightly into the pilot holes (or have entered the soft wood or other material when pilot holes are not necessary) and are supported in an aligned position by the work piece at the tip end and the screwdriver bit at the head end. As the jaws are opened, as illustrated in FIG. 19, the spring-loaded splined screwdriver shaft 142 advances the screws in a rotating fashion until they bottom out.

Actuation of switch 150 also actuates a run-out timer T (FIG. 20) having a first switch contact T' associated therewith and coupled in series with the screwdriver such that the screwdriver will be deactivated after a predetermined time selected to assure that the screws are bottomed out securely mounting the clip to the work piece. A second switch T" of the timer also closes thereby actuating slide cylinders 75 and 147 in a reverse direction which return to the starting position shown in FIGS. 13 and 15. Once the slides have returned to their full back position, limit switch 117 is actuated. The actuation of switch 117 actuates cylinder 19 to re-index the table to the drilling position for the next cycle of operation.

It is noted that timer T will be actuated only when the jaw open limit switch 98' is closed. Limit switch 117 has a second switch contact 117' shown in FIG. 20, which when the slides have returned to their fully rearward position, actuates arm cylinder 112 to cause the arms 105 to swing inwardly, as seen in FIG. 16, thereby capturing the bottommost screws from chutes 108 and positioning them in alignment where they can be gripped by the jaws.

With arms 105 in their screw positioning location, limit switch 113 is actuated which in turn actuates jaw cylinder 97 causing the jaws to close and hold the screws in position as seen in FIGS. 15 and 17. With the jaws in the closed position, switch 98" is actuated to actuate arm cylinder 112 in a reverse direction to swing arms 105 into their open position. When in the fully open position, limit switch 119 is closed to allow the next cycle of operation to be initiated.

Various modifications to the basic control circuit described can be made to cycle the machine as necessary for a given application. Other modifications to the preferred embodiment described herein can likewise be made without departing from the spirit or scope of the present invention as defined by the appended claims.

The embodiments of the invention in which an exclusive property or privilege is claimed are defined as follows.

1. A machine for attaching objects to a work piece comprising:
   a housing supporting reciprocating means having a powered fastening tool mounted thereto, said reciprocating means including gripping means at one end for releasably gripping fastening means;
   means for holding a work piece in predetermined relationship to said housing;
   means for receiving fastening means and positioning said fastening means in alignment with said gripping means;
   dispensing means for singly dispensing objects to be attached to said work piece in predetermined alignment with said gripping means; and
   control means for sequentially actuating said reciprocating, gripping and positioning means to advance fastening means in a manner to capture an object from said dispensing means and further advance said fastening means into contact with said work piece whereupon said gripping means releases said fastening means and permits the object to be attached to said work piece by said fastening tool.

2. The apparatus as defined in claim 1 wherein said reciprocating means comprises a first slide slidably mounted within said housing and a second slide slidably mounted within said first slide, and wherein said gripping means are positioned on said first slide and said fastening tool is positioned on said second slide.

3. The apparatus as defined in claim 2 wherein said reciprocating means further includes means coupled between said housing and said first slide and said first and second slides for advancing said first and second slides in a manner to permit the engagement of said fastening tool with said fastening means held by said gripping means as said first slide advances.

4. The apparatus as defined in claim 3 wherein said fastening means is a screw and said fastening tool is a powered screwdriver having a spring-loaded shaft which is moved into a compressed position as said second slide advances in said first slide and the bit associated with said screwdriver engages said screw.

5. The apparatus as defined in claim 1 wherein said means for holding a work piece comprises:
   a support platform including edge guides for aligning said work piece thereon;
   means for holding said work piece in an aligned position on said platform; and
   means for moving said platform for indexing said work piece to said housing.

6. The apparatus as defined in claim 5 wherein said platform is horizontally oriented to support work pieces comprising panels and wherein said platform is vertically movable to index an edge of a panel thereon to said housing.

7. The apparatus as defined in claim 1 wherein said fastening means comprises screws and said receiving and positioning means comprises:
   a screw holding chute having an open end for dispensing screws therefrom;
   an arm movably positioned on said housing; and
   means for sweeping said arm across said chute end to an inward position to remove a screw from said chute.

8. The apparatus as defined in claim 7 wherein said arm includes a screw shank holding notch having a magnet implanted therein for holding a screw in said notch, and wherein said arm is positioned relative to said chute to hold a screw removed from said chute with the screw head spaced from said arm.

9. The apparatus as defined in claim 8 wherein said arm includes a curved surface adjacent said chute end when said arm is in an inward position to retain additional screws in said chute.

10. The apparatus as defined in claim 1 wherein said objects are clips and said dispensing means comprises a clip holding chute having an open area aligned with the path of travel of said gripping means and including means positioned thereacross to releasably retain a single clip within said open area.

11. The apparatus as defined in claim 1 wherein said fastening means comprises a screw and said gripping means comprises:
   a jaw including a screw head receiving notch and shank receiving recess shaped to hold a screw in alignment with the axis of motion of said reciprocating means and permit rotation of the screw held therein when said jaw is in a closed position; and
   means coupled between said jaw and said reciprocating means for opening and closing said jaw.

12. A machine for screw-fastening an object to a work piece comprising:
   a housing supporting a slide assembly on which a powered screwdriver is mounted, said slide assembly movable along a generally non-vertical axis and including screw gripping means at one end for releasably holding a screw in alignment with a bit of said screwdriver;

means for supplying screws to said gripping means;

means for positioning a work piece in predetermined alignment with said housing:

means for dispensing objects in a position aligned with said gripping means and screwdriver bit; and control means for sequentially actuating said slide assembly to advance said screwdriver bit into engagement with the head of a screw held by said gripping means and advancing said screwdriver and gripping means toward said work piece capturing an object from said dispensing means and actuating said gripping means to release said screw once a tip end thereof contacts said work piece to permit said screwdriver to bottom out said screw in said work piece thereby fastening said object thereto.

13. The apparatus as defined in claim 12 wherein said slide assembly comprises:

a main slide reciprocally mounted within said housing and supporting said gripping means;

a screwdriver slide reciprocally mounted within said main slide and supporting a powered screwdriver; and means for reciprocating said slides to move said slides toward and away from said work piece.

14. The apparatus as defined in claim 13 wherein said screwdriver has a compressible spring-loaded shaft and said screwdriver slide advances as the screwdriver bit seats in a screw held by said gripping means to compress said screwdriver shaft.

15. The apparatus as defined in claim 14 wherein said gripping means comprises:

a jaw including a screw head receiving notch and shank receiving recess shaped to hold a screw in alignment with the axis of motion of said slides and permit rotation of the screw held therein when said jaw is in a closed position; and means coupled between said jaw and said main slide for opening and closing said jaw.

16. The apparatus as defined in claim 15 wherein said supplying means comprises:

a screw holding chute having an open end for dispensing screws therefrom;

an arm movably positioned on said housing; and means for sweeping said arm across said chute end to an inward position to remove a screw from said chute.

17. The apparatus as defined in claim 16 wherein said arm includes a screw shank holding notch having a magnet implanted therein for holding a screw in said notch, and wherein said arm is positioned relative to said chute to hold a screw removed from said chute with the screw head spaced from said arm.

18. The apparatus as defined in claim 17 wherein said arm includes a curved surface adjacent said chute end when said arm is in an inward position to retain additional screws in said chute.

19. A machine for mounting clips to panels comprising the combination of:

a support table for holding panels in a generally horizontal plane;

a housing including powered drill and powered screwdriving means reciprocally mounted therein;

means for indexing said table and housing such that said drill is in alignment with a mounting position on said panel in a first indexed position for drilling pilot holes therein and said screwdriver is in alignment with said mounting position on said panel in a second indexed position;

means for feeding and holding screws and clips such that as said screwdriver is advanced toward said panel in said second indexed position, a screw is held in alignment with a screw receiving aperture in a clip and captures said clip as said screw is advanced toward said work piece until said screw extends into said pilot holes drilled in said panel; and means for actuating said screw holding means to release said screw to permit said screwdriver to bottom out said screw thereby mounting said clip to said panel.

20. The apparatus as defined in claim 19 wherein a pair of power screwdrivers are positioned on a slide assembly reciprocally mounted in said housing and said screw feeding and holding means positions a screw in alignment with each of said screwdrivers.

21. The apparatus as defined in claim 20 wherein said screw holding means comprises a pair of jaw members including configurated recesses therein for rotatably holding a pair of screws, and means for opening and closing said jaw members to release and grip said screws respectively.

22. An improved machine for attaching clips to a work piece by means of advancing screws through said clips and into said work piece along a nonvertical axis, said machine comprising:

a housing;

a main slide assembly reciprocally mounted within said housing and including screw gripping means at one end thereof for releasably gripping screws;

means coupled between said housing and said main slide for reciprocating said main slide between forward and rearward positions;

a screwdriver slide reciprocally mounted within said main slide and including means for mounting a powered screwdriver thereon;

means coupled between said main slide and said screwdriver slide for reciprocating said screwdriver slide between forward and rearward positions on said main slide;

means for actuating said gripping means between screw gripping and screw releasing positions;

means for receiving screws from a supply chute and positioning said screws in alignment with said gripping means;

means for dispensing clips in alignment with said gripping means;

means for positioning a work piece in alignment with said gripping means; and control means for sequentially operating said main slide and said screwdriver slide to advance said screw gripping means and screw therein toward said work piece thereby capturing a clip while the screwdriver seats against the head of a screw held within said gripping means, and for actuating said gripping means to release a screw once said screw held therein is in seated engagement with said work piece thereby permitting said screwdriver to drive said screw into a bottomed out position holding said clip to said work piece.

23. The apparatus as defined in claim 22 wherein said gripping means comprises:
- a pair of screw gripping jaw members pivotally coupled to said main slide;
- a jaw slide reciprocally mounted within said main slide and coupled to said jaw members and said actuating means such that as said actuating means reciprocates said jaw slide, said jaw members move between a closed screw holding position and an open screw releasing position.

24. An apparatus for singly removing fastening means from a supply chute and positioning the fastening means in an aligned position between a work piece and a fastening tool comprising:
- a supply chute for supplying fastening means from an open end thereof;
- an arm movably positioned to sweep across said open end of said chute and including a notch therein shaped for receiving and holding a fastening means from said chute; and
- means for actuating said arm to move from said receiving position to an aligning position.

25. The apparatus as defined in claim 24 wherein said arm includes a magnet implanted therein with one end adjacent said notch for holding a fastening means in said notch.

26. The apparatus as defined in claim 25 wherein said arm is pivotally mounted to a housing supporting said supply chute and said arm includes a surface spaced from said notch which is positioned adjacent to and aligned with said open end of said supply chute to retain additional fastening means therein when said arm pivots from a receiving to an aligning position.

* * * * *